United States Patent [19]

Savill

[11] Patent Number: 4,669,791
[45] Date of Patent: Jun. 2, 1987

[54] CONNECTOR APPARATUS

[75] Inventor: Ian C. Savill, London, England

[73] Assignee: Integrated Circuit Systems, Ltd., Crawley, England

[21] Appl. No.: 771,860

[22] Filed: Sep. 3, 1985

[30] Foreign Application Priority Data

Sep. 6, 1984 [GB] United Kingdom ................ 8422527
Apr. 15, 1985 [GB] United Kingdom ................ 8509579

[51] Int. Cl.⁴ .......................................... H01R 13/637
[52] U.S. Cl. ...................................... 439/34; 439/38; 439/132; 439/158; 439/197
[58] Field of Search .................... 339/10, 12 R, 12 G, 339/34, 35, 45 R, 45 M, 75 R, 75 M, 117 R; 285/920

[56] References Cited

U.S. PATENT DOCUMENTS

| 2,441,363 | 5/1948 | Krueger | 339/45 R |
| 2,703,870 | 3/1955 | Minto | 339/34 |
| 3,118,713 | 1/1964 | Ellis | 339/12 R |
| 3,345,604 | 10/1967 | Henschen et al. | 339/34 |
| 3,383,468 | 5/1968 | Bryan et al. | 339/34 |
| 3,431,428 | 3/1969 | Van Valer | 339/12 R |
| 3,506,139 | 4/1970 | Cope et al. | 339/35 |
| 3,608,932 | 9/1971 | Brown | 285/18 |
| 3,609,635 | 9/1971 | Harris | 339/45 |
| 3,737,181 | 6/1973 | Low et al. | 285/920 |
| 4,087,119 | 5/1978 | Capdebosc et al. | 285/18 |
| 4,411,317 | 10/1983 | Gieswein | 166/347 |
| 4,453,745 | 6/1984 | Nelson | 285/18 |

FOREIGN PATENT DOCUMENTS

| 1640443 | 5/1970 | Fed. Rep. of Germany . |
| 2043720 | 10/1971 | Fed. Rep. of Germany ........ 339/35 |
| 2359195 | 6/1975 | Fed. Rep. of Germany . |
| 2425139 | 11/1975 | Fed. Rep. of Germany . |
| 2629030 | 1/1977 | Fed. Rep. of Germany . |
| 3023359 | 1/1982 | Fed. Rep. of Germany . |
| 820017 | 9/1959 | United Kingdom . |
| 1401583 | 7/1975 | United Kingdom . |
| 1519855 | 8/1978 | United Kingdom . |
| 1558829 | 1/1980 | United Kingdom . |
| 2056611 | 3/1981 | United Kingdom . |
| 2136902 | 9/1984 | United Kingdom . |

Primary Examiner—John McQuade
Attorney, Agent, or Firm—Beveridge, DeGrandi & Weilacher

[57] ABSTRACT

A connector apparatus capable of connecting with a complimentary connector for the supply of energy, signals or a commodity has a connector part which can be retracted into the apparatus in response to a control signal to disengage the complimentary connector. The retraction movement may be caused by a piston and cylinder arrangement or by an electromagnet. The connector arrangement has many applications and may be released in response to a variety of circumstances. For example, it may be used in a power supply to a garaged vehicle or grounded aircraft and be arranged to release upon release of the vehicle or aircraft brakes. It may be used in a discharge or filling hose from or to a tanker vehicle and be arranged to release upon starting of the vehicle. It may furthermore be connected in a gas or water supply and be arranged to release in-response to a signal from a gas or moisture detector.

8 Claims, 11 Drawing Figures

CONNECTOR APPARATUS

BACKGROUND OF THE INVENTION

1. Field of the Invention

This invention relates to a connector apparatus capable of connecting with a complementary connector for the supply of energy, signals or a commodity from one to the other.

2. Description of the Prior Art

A multitude of types of connector are known for use with complementary connectors in order to supply energy (e.g. electrical, pneumatic or hydraulic), signals (e.g. electrical, pneumatic or hydraulic) or commodities (e.g. gases, liquids or flowable solids). With many everyday applications, it is necessary to disengage readily the connector apparatus from the complementary connector. Some types of connector apparatus are adapted to be a push fit into or onto a complementary connector so that by manual pulling the connector apparatus can be disengaged from the the complementary connector. For example, at the end of the evening it is recommended to remove the electric plug of a television receiver from its wall supply socket. Similarly, in cold climates a motor vehicle may be plugged into an energy supply in order to maintain the vehicle engine at a temperature suitable for easy starting as and when a user requires. In order to prevent damage to the vehicle connector, it is important that the vehicle connector is disengaged from the supply of power before a user drives the vehicle away. Aircraft, when on the ground are commonly connected to a ground based electric supply to provide power for running the aircraft services when its engines are shut down and also to provide power for engine start-up when required.

A similar situation exists for emergency vehicles which must be kept on standby continuously. In this case, a number of complex cable retraction systems have been developed to avoid damage to the connector apparatus when a vehicle is driven away without the connector apparatus being disconnected from the source of energy. These complex arrangements are both inconvenient and expensive. Indeed, the measure to ensure safe disengagement between a connector apparatus and a complementary connector can be sufficiently inconvenient to encourage a user to by-pass the arrangment.

There are many other situations where it would be desirable to disconnect a connector in response to certain circumstances in order to avoid damage.

Examples of previously known connectors are to be found in U.K. Patent Specifications Nos: 2136902, 1558829 and 1519855 which disclose connectors having independent disconnection devices none of which would be well suited for a simple power/signal/supply connector.

SUMMARY OF THE INVENTION

According to one aspect of the invention there is provided a connector apparatus adapted to be connected with a complementary connector for the supply of energy, signals or a commodity from one to the other, the connector apparatus including an enclosure containing a connection device movable between operative and in-operative positions for engagement with and dis-engagement from the complementary connector, means in the enclosure for moving the connection device into the operative position for making a connection with the complementary connector and means in the enclosure to respond to a control signal to move the connection device to an inoperative position to break the connection with the complementary connector.

The apparatus may include at least one electrical power connection element so that electrical power can be supplied from the connection device to the complementary connector or vice versa, and/or at least one signal connector element so that signals can be transmitted from the apparatus to the complementary connector or vice versa, and/or at least one flow connector element so that a commodity can be transferred from the connection device to the complementary connector or vice versa.

Preferable, the apparatus includes at least one portion which is adapted to mate with the complimentary connector, the disengagement means being arranged to retract that portion into the appparatus so as to disengage the complementary connector from the apparatus. Thus the connector falls apart, rather than the parts being fired apart, which could cause injury. The apparatus may include at least one further portion which is adapted to abut the complementary connector to resist movement of the complementary connector with respect to the retractable portion upon operation of the disengagement means.

The apparatus may include sensor means to sense an abnormality in the surroundings related to a commodity supplied to the connection device and for producing the control signal response thereto. For example, the connector apparatus may be placed in the water supply to a machine such as a domestic washing machine, and the sensor may be arranged to detect water accumulation on the base plate of the machine. Furthermore the apparatus may be placed in a gas main to a building, ship or caravan and the sensor may be arranged to detect a gas leak.

The apparatus may alternatively or additionally include sensor means to sense excessive stress in cable, hose or the like connected to the apparatus and for producing the control signal in response thereto. Thus the apparatus may be arranged so that the connector is disconnected before the cable or hose is over-stressed.

The apparatus may alternatively or additionally include sensor means to sense operation of an appliance, vehicle, ship, equipment, or the like, to which the apparatus is connected and for producing the control signal in response thereto. Thus, the apparatus may be connected, for example, to an essential system of, for example, a tanker vehicle and may disconnect the connection of a re-fuelling hose upon, for example, release of the vehicle handbrake.

The disengagement means may comprise a piston and cylinder arrangement disposed to move the apparatus and the complementary connector relative to each other in response to said control signal. For example when the apparatus is used to connect a vehicle to a supply, said input means may be responsive to a control signal provided by operation of a compressed air system of the vehicle.

Alternatively, the disengagement means may comprise an electromagnet arrangement disposed to move the connection device and the complementary connector relative to each other in response to said control signal. Again, when the connector is used for connecting a vehicle to a supply, said input means may be responsive to a control signal provided by an ignition system of the vehicle or operation of an access to the interior of the vehicle.

The apparatus may include means to sense breaking of said connection and to terminate the supply of energy, signals or a commodity.

The apparatus may also include biassing means to return the connector apparatus after operation of the disengagement means.

According to a further aspect of the present invention, there is provided a vehicle having a connector apparatus for connection via a complementary connector to an external supply, detection means to detect release of the brakes of the vehicle, energisation of the ignition system of the vehicle or some other operation indicative of preparation of the vehicle for use, and means for releasing or facilitating release of the complementry connector from the connector apparatus in response to the detection means.

DESCRIPTION OF THE PREFERRED EMBODIMENTS

Figure 1:
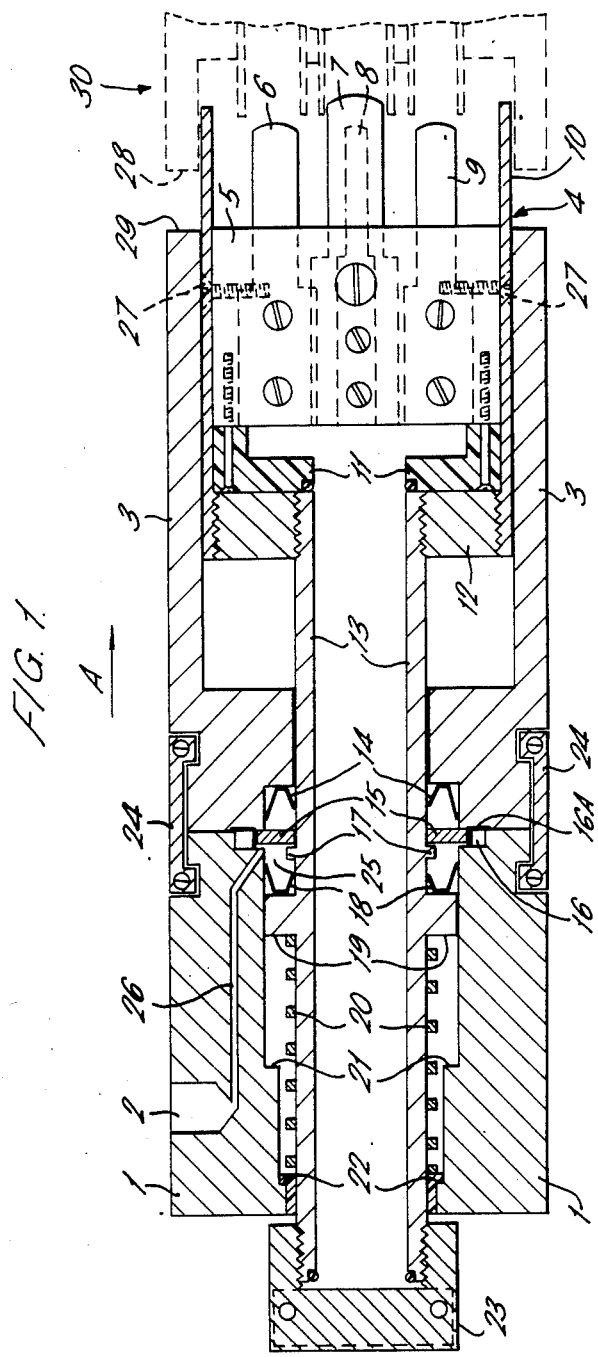
FIG. 1 is a longitudinally sectioned side view of a connector apparatus.

Referring to FIG. 1 of the drawings, the connector apparatus comprises an enclosure consisting of a first cylinder 1 linked to be coaxially aligned with a second cylinder 3 by means of a joining ring 24. The cylinder 1 and 3 are formed to receive an axially aligned tubular piston rod 13. One end of the piston rod 13 is threaded to receive a cable clamp 23 whereas the other end of the piston rod 13 is threaded to receive a connector plug 4, a side view of which is illustrated in FIG. 1.

The piston rod 13 is formed to have an outwardly facing flange 19 approximately midway along its length. The flange 19 acts as a piston. The cylinders 1 and 3 are formed so that the piston 13 can slide between a shoulder 21 in the cylinder 1 and stop ring 15 located in an annular recess 16 formed at the joint between the cylinder 1 and 3. The joint between the cylinder 1 and 3 is sealed by an O-ring 16a. A further shoulder 22 is provided to the left of the shoulder 21 so that a spring 20 mounted to encircle the piston rod 13 urges the rod 13 and piston 19 in the direction of arrow A.

A travel limiting flange 17 is provided on the piston rod 13 so that movement of the rod 13 in direction A is limited by contact of the flange 17 with the stop ring 15. At this position an annular space 25 remains between piston 19 and stop ring 15. A port 2 provided in the side of cylinder 1 is connected by a passageway 26 to the space 25. Thus, when sufficient air pressure is applied to port 2 to overcome the action of the spring 20, the piston rod 13 moves in the direction opposite to arrow A. O-ring seals 18 and 14 of suitable cross-section as illustrated are provided on either side of the stop ring 15 to seal between the piston rod 13 and the cylinder 3. The connector plug 4 comprises an annular block 12 threaded to the end of tube 13, the block 12 also being threaded on it circumference to receive a tube 10. An insulating block 5 is located within tube 10 by means of screws 27 through the wall of the tube 10 and rear insulation cover 11 is provided between the block 5 and the annular block 12. Four plug pins 6 to 9 are provided within the insulating block in conventional manner. Wiring passing through the cable clamp 23 and the piston rod 13 and connected to the pins 6 to 9 has been omitted for the purposes of clarity. Pins 6 and 9 are live and neutral terminals respectively and pins 7 and 8 are earth terminals.

In use, the connector apparatus illustrated is mounted in a vehicle, for example an aircraft, and port 2 can be connected to a source of compressed air, for example the brake air supply. The connector plug 4 is arranged to protrude from the vehicle side. When the vehicle is not in use no air pressure is applied to port 2. Consequently, the spring 20 urges the piston rod 13 in direction of arrow A so that connector plug 4 protrudes from cylinder 3 to allow connection with a complementary connector socket 30. In this way, electrical power can be supplied to the vehicle. When the vehicle is mobilised, and the brakes are released, air pressure is applied to port 2 so that the biassing force of spring 20 is overcome and the piston rod 13 moves in the direction opposite to arrow A. Consequently, the connector plug 4 retracts into cylinder 3 so that the face 28 of the complementary connector socket engages the end face 29 of cylinder 3 so that the connector socket is moved to a position disengageing with connector plug 4. By arranging for the air supply to port 2 to be connected to an essential system of the vehicle, disengagement of the socket from connector plug 4 is assured before movement of the vehicle. For example, in a vehicle with air pressure brakes, these must be charged before movement of the vehicle, consequently in the process of charging the brakes the connector plug 4 and connector socket 30 are disengaged.

It will be apparent that the supply of air pressure to port 2 can be connected with other systems of the vehicle. Although a piston and cylinder arrangement have been illustrated in FIG. 1, a person skilled in the art could construct a connector apparatus embodying the invention to incorporate an electromagnet arrangement where by actuation of an essential system of the vehicle operates for example, a solenoid to cause disengagement of the connector plug and connector socket. The actuation of the solenoid can be linked to the ignition system of the vehicle, a door switch of the vehicle or some other operation indicative of preparation of the vehicle for use. It will also be apparent that although the system illustrated relates to a push fit connector apparatus, a person skilled in the art could, equally construct a connector apparatus embodying the invention relating to a bayonet type plug and socket connector. The pins 7 and 8 illustrated in the figure can be employed as an earth return test loop so that when the connector plug and socket are disengaged the source of energising power is deactivated.

It will also be apparent that while the above description refers to the connector apparatus illustrated being located in a vehicle, the connector apparatus could be provided at the end of a lead for connection to a connector socket formed in a vehicle. Such an arrangement would be particularly suitable to a system where the vehicle is stored in a garage, the supply of air pressure to port 2 being activated in response to, say, opening of the garage door. The invention has particular use for supplying energy to vehicles in cold climates and for supply of energy to emergency vehicles which must be kept at a suitable standby operating temperature for emergency use.

Figure 2:
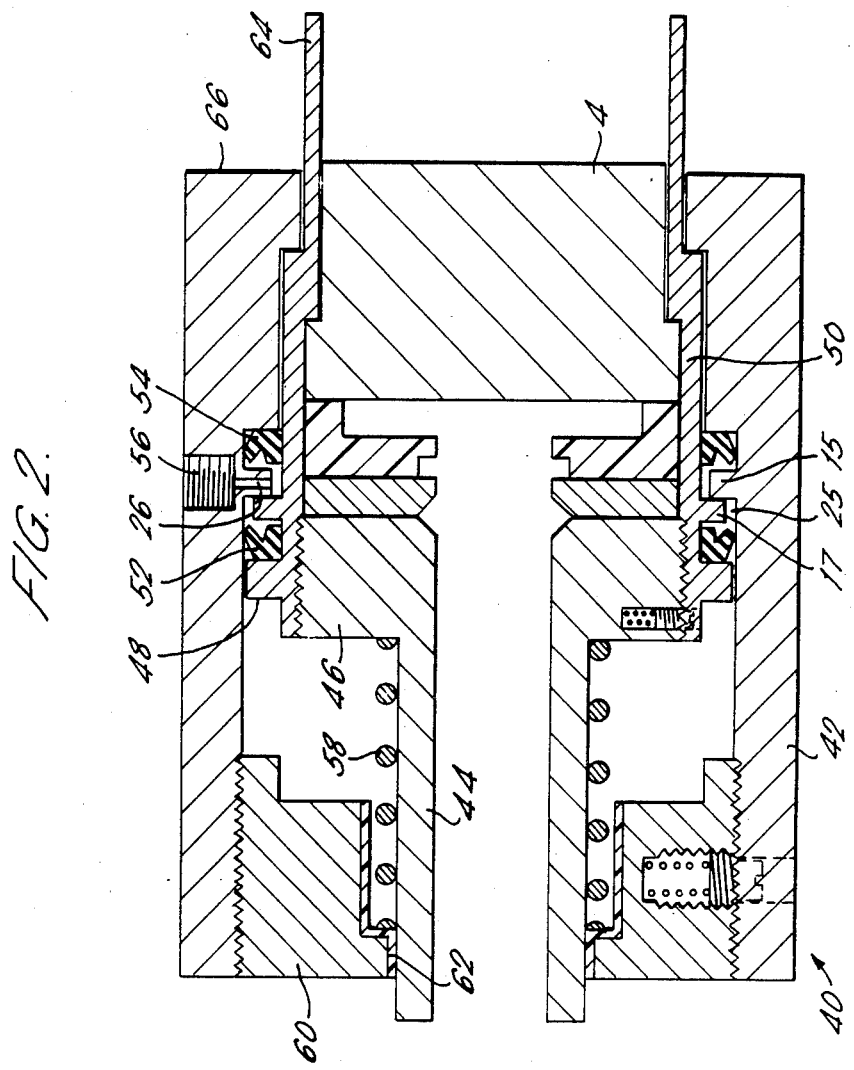
FIG. 2 is a similar view to that of FIG. 1 of another connector apparatus.

Referring to FIG. 2, there is shown a similar connector 40 similar to that of FIG. 1 but incorporating certain modifications. The connector 40 has a unitary cylindrical housing 42 containing a piston rod and piston assembly 44, 46, 48. The piston rod 44 is tubular and has a flage 46 at the inner end thereof. A tube 50 is screw threaded at one end 48 to the flange 46 so that the tube end 48 and flange 46 form a piston. The piston carries a seal 52 to seal between the piston and the housing, and the housing carries a further seal 54 to seal between the housing and the tube 50. The piston is actuated by hydraulic or pneumatic pressure applied via a port 56 between the seals 52, 54 to move the piston to the left (as seen in the drawing) against the action of a return spring 58 which extends between the piston flange 46 and an end plate 60. The end plate is screw threaded into the end of the housing 40 and has a central opening in which the piston rod 44 slides. Other components of the connector identical or similar to corresponding components of the embodiment of FIG. 1 have been allotted the same reference numedrals.

A connector unit 4 is mounted within the tube 50 and may be similar in arrangement to that shown in FIG. 1 and described above.

In operation, upon application of pressure via the port 56, the piston moves to the left, and thus the connector unit 4 and the projecting end 64 of the tube 50 are retracted in to the housing 42. Thus, a complementary connector fitted to the connector unit 4 is disengaged by pressing of the complementary connector against the right-hand end wall 66 of the housing 42.

Figure 3:
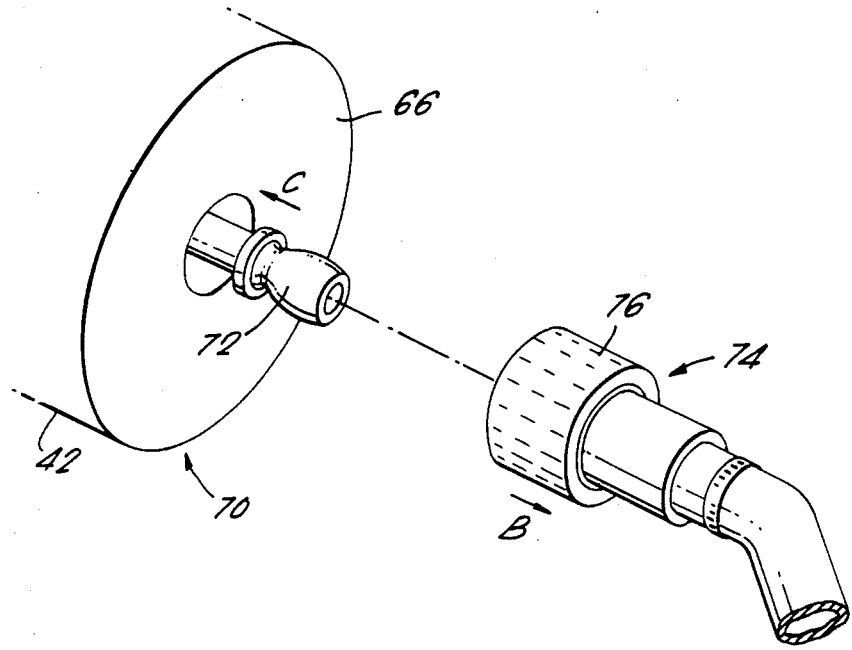
FIG. 3 is a partial perspective view of a further connector apparatus.

There follows a description with reference to FIG. 3 of another connector apparatus 70.

Pneumatic connectors are known which comprise a male part 72 which fits a female part 74, the female part 74 having a spring loaded collar 76 which when moved in the direction B enables the two parts to be released. It is also known for the male and/or female parts to be self-sealing upon release.

As shown in FIG. 3, the male part 72 is used to replace the piston 48 and its associated components in the arrangement shown in FIG. 2, the male part projecting from the end 66 of the housing and being retractable in the direction C upon operation of the apparatus. Upon such retraction, the collar 76 of the female part 74 abuts the end wall 66 of the housing and moves in the direction B relative to the rest of the female part 74 and thus the male and female parts are disengaged.

It will be apparent that many modifications may be made to the three connectors described specifically above whilst still adopting the underlying principal of the invention, that is to say the provision of a connector which can be manually connected and disconnected repeatedly, but which can also be automatically disconnected repeatedly, preferably by retraction of one of the parts of the connector, in response to a control signal. Upon such automatic disengagement, the connector is not damaged, and can immediately be reused.

Figure 4:
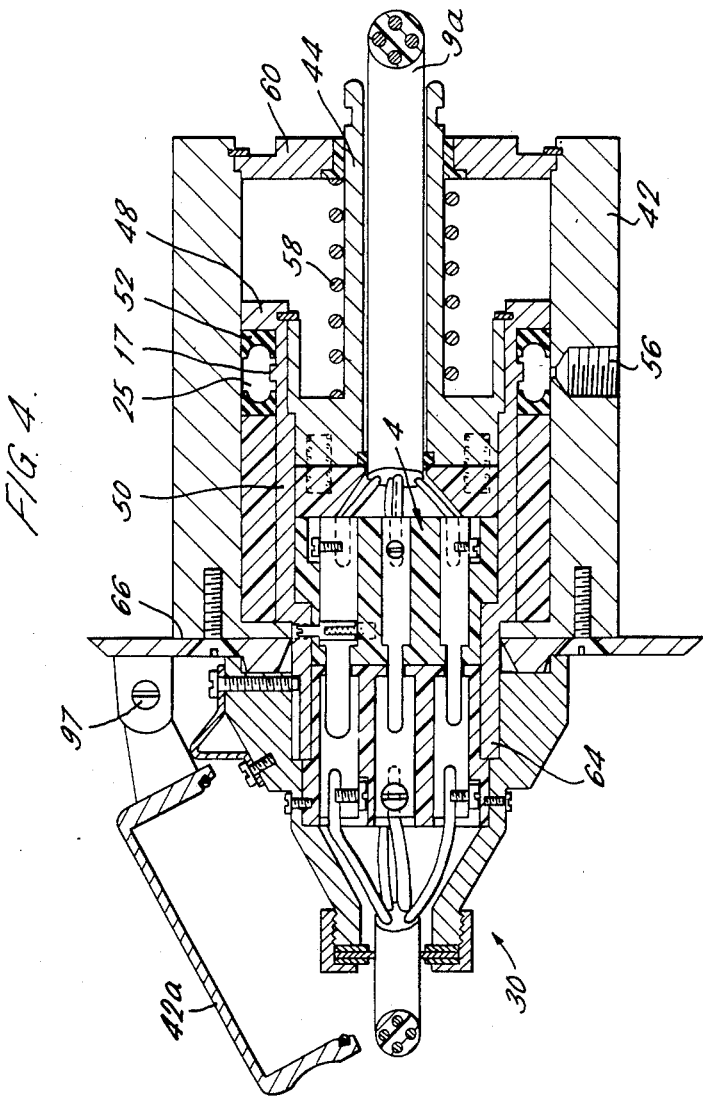
FIGS. 4 to 6 show a connector similar to that of FIG. 2 in greater detail and incorporating certain modifications.
Figure 5:
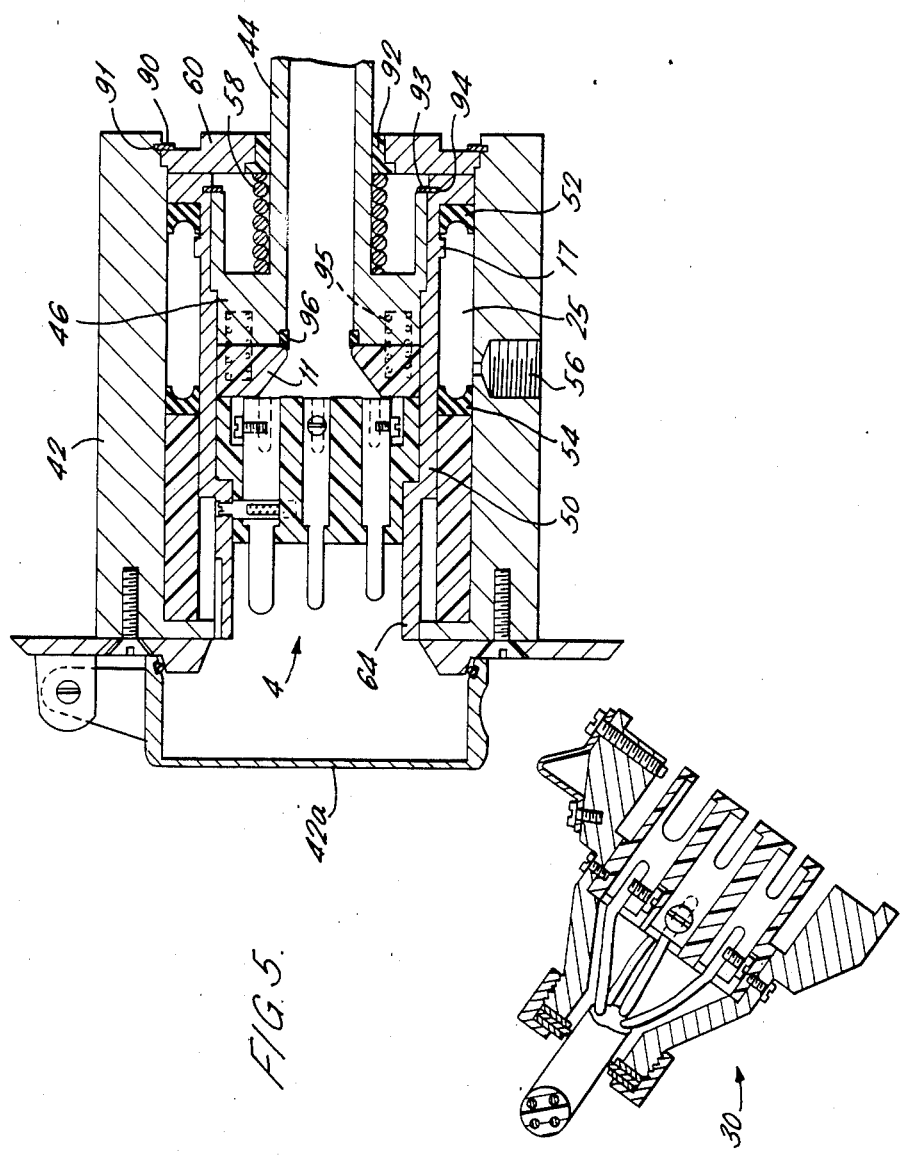
Figure 6:
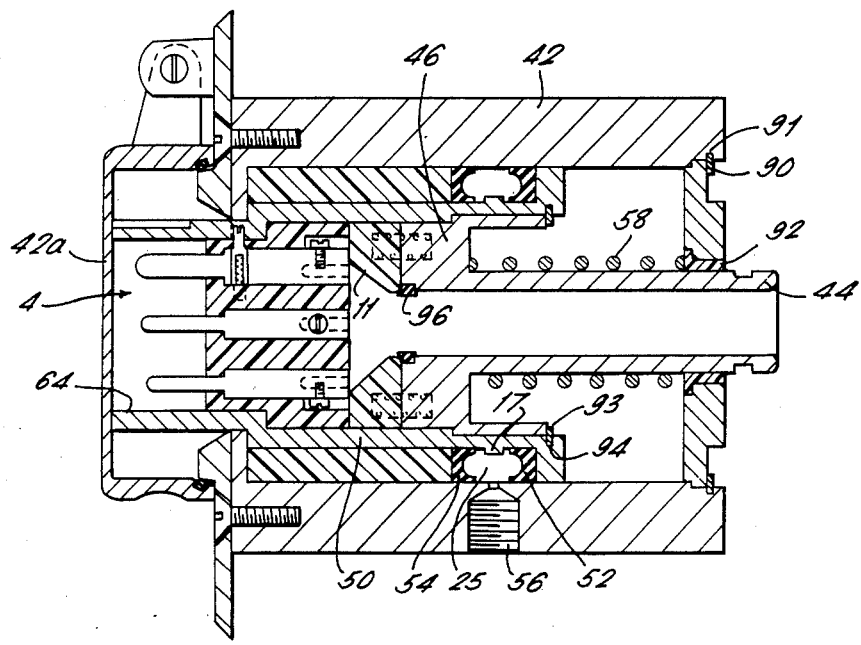

Reference is now made to FIGS. 4 to 6 of the accompanying drawings which illustrate a further connector apparatus generally of the form illustrated in FIG. 1 and particularly FIG. 2 and like parts have been allotted the same reference numerals. The main differences between the connector of FIGS. 4 to 6 and that of FIG. 2 are that seals 52 and 54 are held in place by air pressure alone and the stop ring on cylinder 42 is omitted; end plate 60 at the rear end of the cylinder 42 is held in place by a spring ring 90 docking in a groove 91 in the end of the cylinder instead of being screwed into the end of the cylinder to simplify manufacture of the cylinder 42; an insert collar 92 is mounted in the bore in end place 60 against which the spring 58 bears; a flange 46 of piston assembly 44 is located in tube 50 by a locking ring 93 engaging in the groove 94 into tube 50 instead of a screw threaded connection again to simply manufacture of the tube 50. Further, insulation cover 11 trapped between the connector plug 4 and the flange 46 is sprung away from the flange by means of compression springs indicated at 95 and a sealing ring 96 is trapped in a groove at the end of the bore in the piston 44 by the cover 11 to engage the cable 9a extending through the piston rod as shown in FIG. 4.

The piston 44 projects through the collar in the end plate 60 at the rear of the cylinder and a cable clamp (not shown) is attached to the projecting end of the piston. Alternatively, the piston 44 may slide telescopically in an encircling sleeve mounted at the end of the cylinder to accommodate the full travel of the piston 44 and thereby avoid projection of the piston from the rear end of the cylinder.

At the forward end of the cylinder 42, the front wall 66 of the housing has a closure cap 42a hinged thereto at 97 to engage over the end of plug 4 when the latter is out of use. When a complementary connector 30 is to be connected to the plug 4 as shown in FIG. 4, the end cap 42a is swung to one side revealing the plug 4 and the connection can then be made. The plug 4 is retracted by air pressure against the action of the spring 58 when a control signal is supplied to the source of air pressure to which port 56 is connected extracting the plug connector pins from the complementary connector 30. The connector 30 then falls away as illustrated in FIG. 5 and the cap 42a closes over the retracted plug 4. If the connector is re-activated by release of air pressure to the port 56, the spring 58 drives the piston and with it the plug 4 forwardly to the operative position inside the closure cap 42a ready for connection as illustrated in FIG. 6 of the accompanying drawings. The arrangement is otherwise the same as that of FIGS. 1 and 2.

Reference is now made to FIGS. 7 and 8 of the accompanying drawings which illustrate a fluid flow connector of the form shown diagrammatically in FIG. 3 as described above and shown in greater detail in FIGS. 7 to 9. In this case the outer cylinder 42 has a fixed inner sleeve 100 at its rearward end held in place by a locking member 101 to which a spigot 102 at the end of a receiving conduit or hose 103 is connected.

The male pipe 72 forms a sliding piston within the cylinder 42, the variable chamber of the piston being indicated at 25 and being connected to a source of pressurised air or other gas through port 56. The operative end 72a of the male part 72 projects, in the extended position of the male part, from the end wall 66 to engage in the female part 74 to which a further connector hose is attached (not shown) leading to a supply of fluid under pressure. The female part 74 has a self-sealing valve to be opened automatically by the end 72a of the male part on insertion of the latter. The female part 74 is locked to the male part by means of a plurality of balls 104 disposed in sockets 105 in the female part within the collar 76 and which can project from the inner side of the female part to engage recesses 106 disposed around the male part. The arrangement is such that the male part can always withdraw from the female part on application of pressure to the cylinder 25 which drives the balls 104 radially outwardly into the socket in the female part. On the other hand, tension applied to the female part is resisted by the engagement of the balls in the recesses 106 on the male part to prevent a pull on the female part from disengaging the connection. When it is required to release the connection manually, the collar 76 is moved in the directon B away from wall 66 to release engagement of the balls 104 in the recesses 106. The sockets 105 for the balls 104 are so shaped that the balls can move readily both inwardly and outwardly without escaping from the socket.

Retraction of the male part 72 into the cylinder 42 is resisted by spring 58 acting between an end wall of sleeve 100 and a cup-shaped member 110 trapped in the male part. A spring loaded valve 111 is mounted in the nozzle of the male part with a seal 112 to bear against a shoulder 113 formed in the male part. The valve is held in the closed position by compression spring 114 acting between the valve and the base of the cup-shaped member 110. When the two components are brought together the self-sealing valve in female part 74 is opened by male part 72a and the resulting pressure on valve 111 lifts the valve from its seat establishing flow through the male part. The sleeve 100 has passageways 115 formed in the base wall of the sleeve through which the fluid flows and the cap 110 has similar passages (not shown) for flow of fluid.

In the event of a signal from the pressure control system to which port 56 is connected causing air or other fluid to be supplied under pressure to cylinder 25, the male member 72 is retracted into cylinder 42 disengaging the operative end 72a of the male part from the female connector. In so doing the valve 111 is closed against its seal by fluid pressure in the male part in conjunction with spring 114. The male part is eventually fully retracted into the cylinder 42 and the female part 74 and drops away as shown in FIG. 8 and the self-sealing valve in female part 74 closes automatically.

Figure 7:
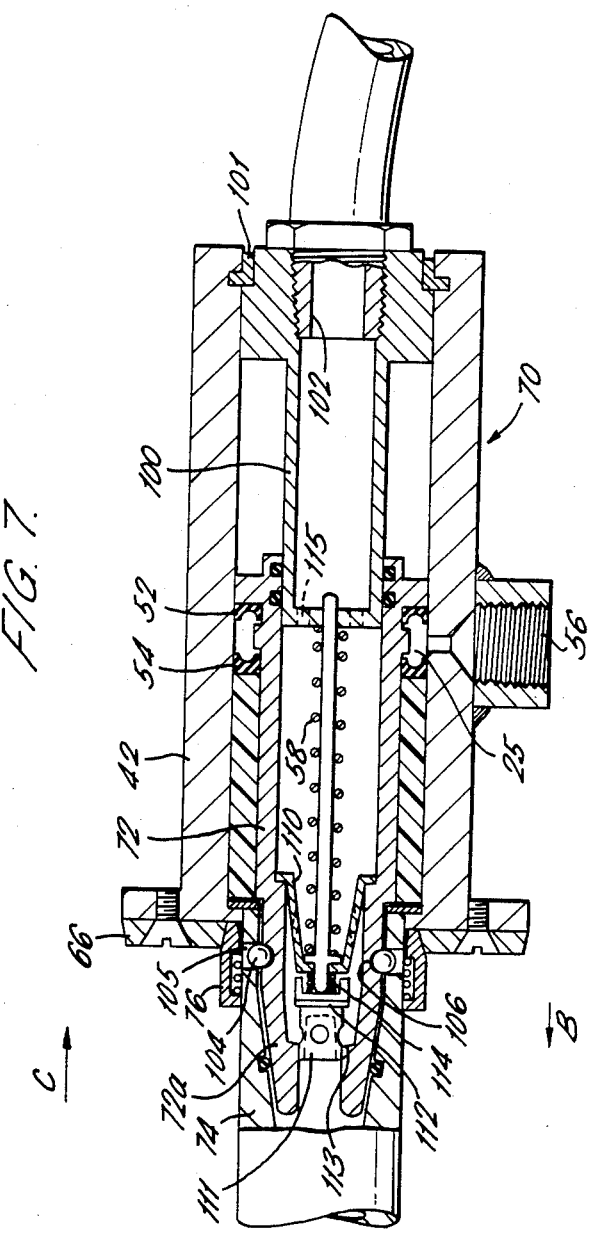
FIGS. 7 to 9 show a further connector apparatus.
Figure 8:
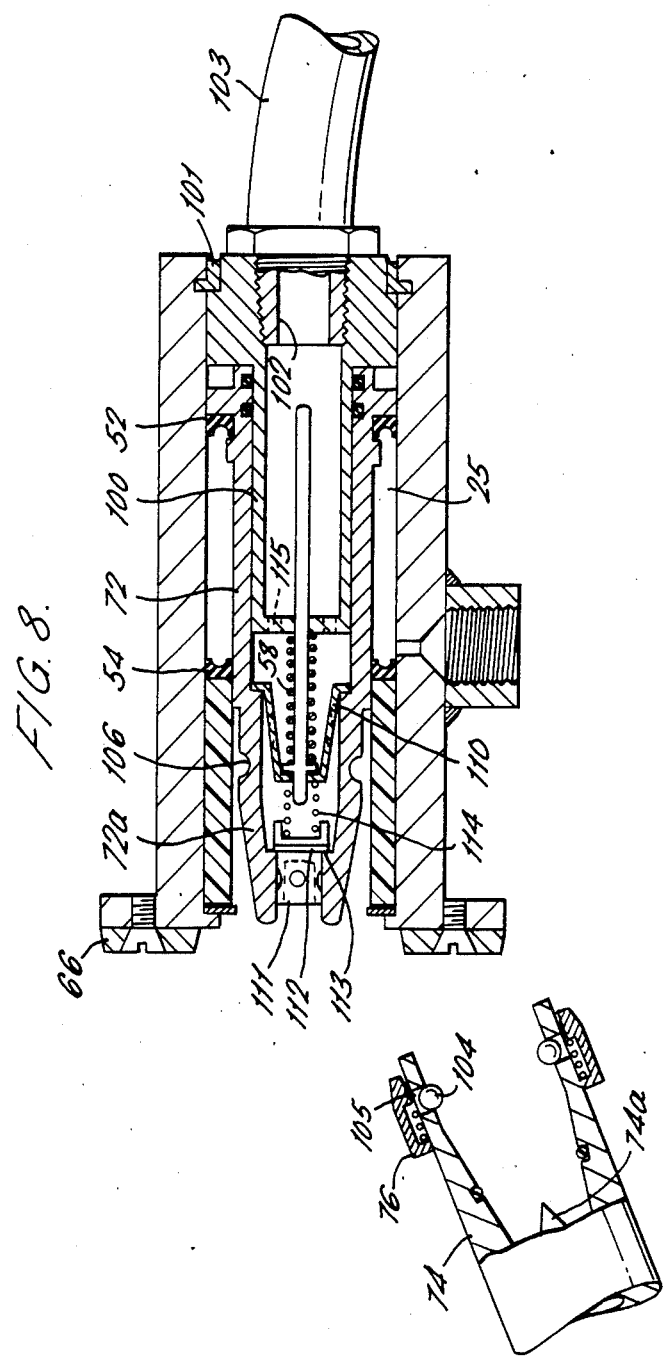
Figure 9:
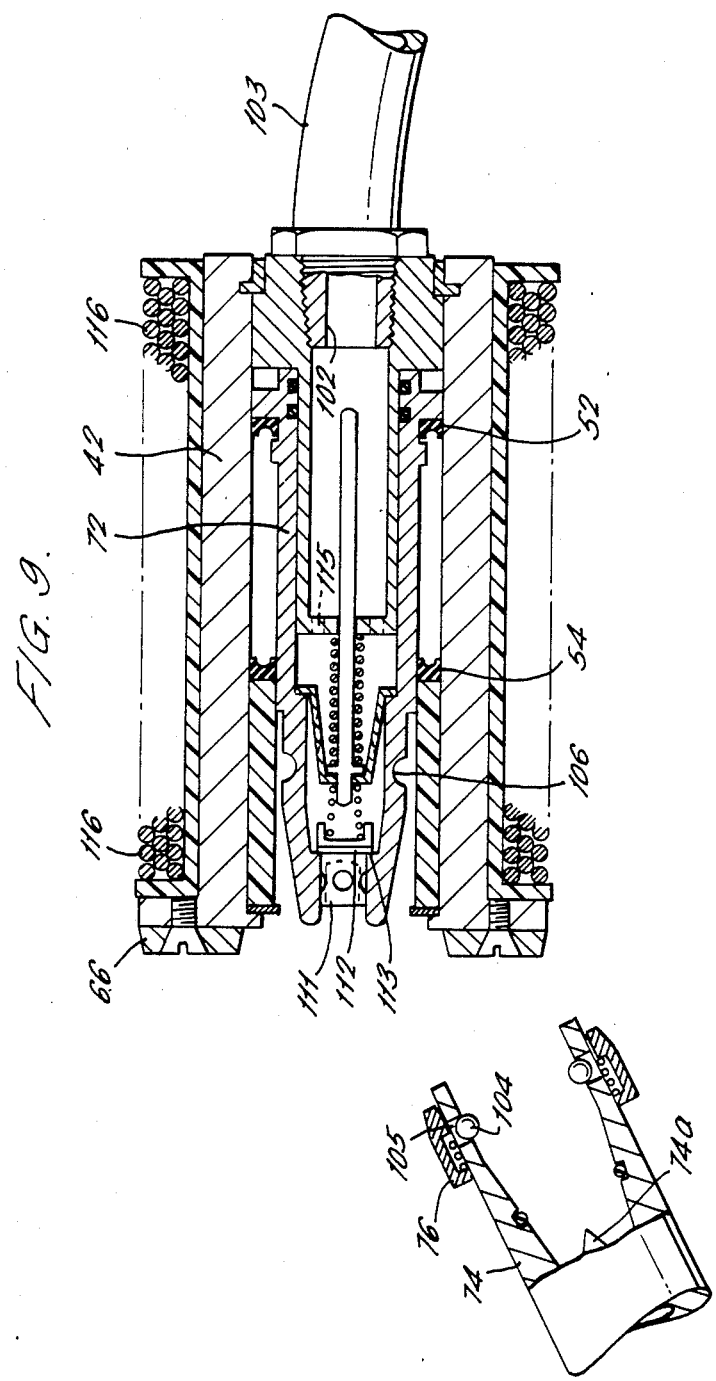

FIG. 9 of the drawings shows a further form of the apparatus of FIGS. 7 and 8 except that the piston arrangement for retracting the male part 72 is not fluid pressure operated but is operated by means of an induction coil 116 wound around the cylinder 42 and the male part 72 is formed from the magnetisable material to act as an armature to be extended and retracted into and out of the cylinder 42 by passage of current one way or the opposite way through the coil 116.

Figure 10:
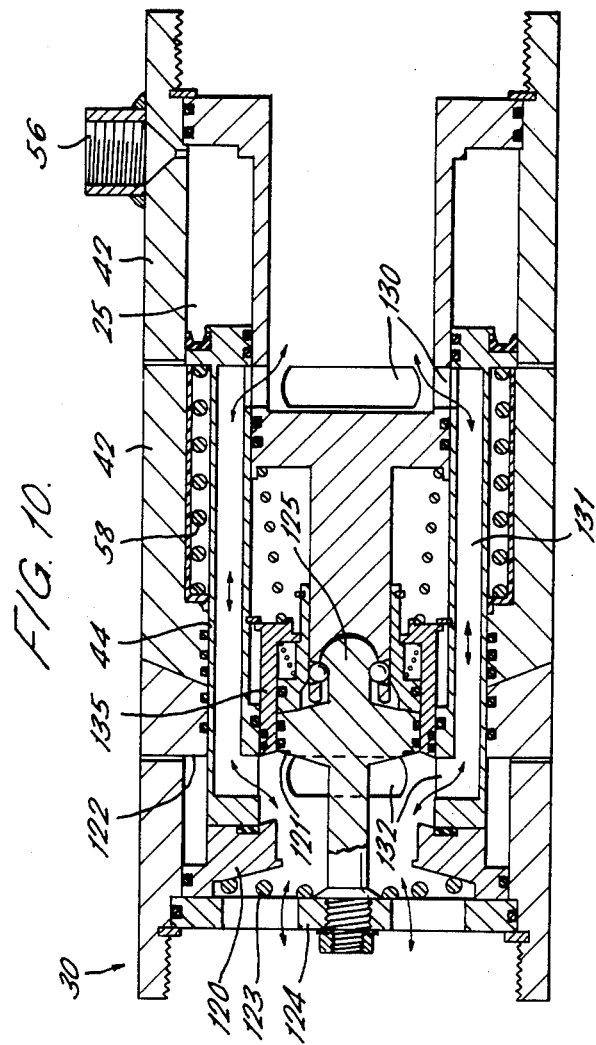
FIGS. 10 and 11 show a still further connector apparatus.
Figure 11:
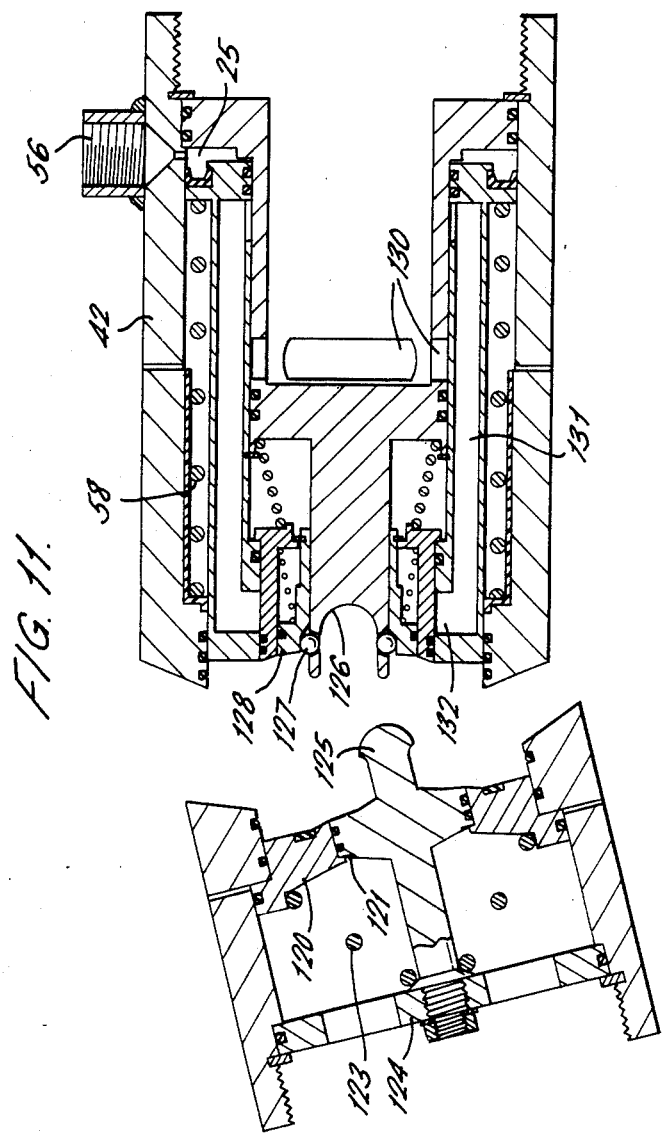

FIGS. 10 and 11 show a further connector apparatus in which the moving operating member is mounted on the connector and an openable valve is mounted on the complementary connector. The arrangement is similar to those described above and has a piston 44 slidable in cylinder 42. The piston 44 is extended from the cylinder by air pressure in chamber 25 to which port 56 is connected to receive a control signal from control apparatus as described earlier. The piston is extended against resistance of a compression spring 58. Complementary connector 30 has an annular valve member 120 which is engageable with a valve seat 121 formed on a central spigot and an outer valve seat 122 formed by an annular shoulder encircling the inner periphery of the complementary connector. The valve member is held against the respective valve seats by compression spring 123 engaging between the valve member and a ring 124 also mounted on the spigot and axially spaced from the seat 121.

The central spigot of the complementary connector is formed with a waisted projection 125 which engages, when the two parts of the connector are brought together, in a socket 126 in the main part of the connector. Socket 126 carries radially inwardly moving balls 127 actuated by a cam surface on an encircling sleeve 128 itself inter-connected to the piston 44 through spring-biassed lost motion connections. The piston 44 has inwardly facing ports 132 at its outer end which are initially closed by an inner sleeve 135. When the piston is extended to engage the complementary connector, the piston 44, sleeve 135 and sleeve 128 all move forward together towards the complementary connector. Sleeve 128 then hits elements 125 and locks balls 127 into the waisted part of element 125 to lock the components of the connector together. Piston 44 and sleeve 135 continue to move forward together engaging valve 120 and lifting the latter away from its seat 121. Sleeve 135 engages over and seals with seat 121 as valve 120 disengages from the seat. Piston 44 continues to force valve 120 back to its stop 124 and at the same time ports 132 become exposed in the cavity of valve body 30 to allow flow of fluid through the connector. In the event of a pressure signal causing a loss of pressure in chamber 25, piston 44 is immediately allowed to retract into the connector under the influence of the spring 58 closing over sleeve 135 thereby closing ports 132, allowing valve 120 in the complementary connector to close and, after the lost motion has been taken up, retracting sleeve 128 to release the balls 127 from the waisted part of the projection in the complementary connector and thereby releasing the complementary connector allowing it to separate from the connector as shown in FIG. 11.

Although the flow through the connector has been described as being from the female to the male part, the arrangement is equally applicable to flow in the opposite direction.

The following is a list, by way of example, of areas of application for the connector: aircraft ground power supply units, fuel connectors and other service supplies and monitoring connections; in-flight detachable equipment; space vehicles; emergency vehicles, such as fire tenders, crash rescue vehicles and ambulances; locomotive and road haulage tankers; shore lines for water craft; oil refinery and chemical works loading areas; private vehicles; mains supplies to domestic and industrial sites and to caravans; and domestic appliances.

I claim:
1. A connector apparatus comprising
coaxially arranged and relatively movable first and second connector bodies, said bodies having respective portions arranged to abut each other,
said first connector body containing an axially-extending tubular member,
said tubular member being axially movable relative to said first connector body, said tubular member having at one end first connection means,
said first connection means being arranged to be connected to complementary connection means of the second connector body for the supply of energy, signals or a commodity from one to the other, and
said tubular member having an axially-extending internal space for the supply of said energy, signals or commodity to said first connection means,
said first connection means being movable between a first position for engagement with said complemen- tary connection means and a second, retracted position for disengagement from said complementary connection means, and further means being provided responsive to a control signal to move said first connection means from said first position to said second position, wherein, during said movement, the abutment of said portions restricts movement of said complementary connection means whereby to effect disconnection, said connection between said first connection means and said complementary connection means constituting the sole interconnection between said first connector body and said second connector body.

2. Apparatus as claimed in claim 1, said first connector body having a radially inwardly facing cylindrical surface and said tubular member having a radially outwardly facing cylindrical surface, said surfaces being radially spaced thereby to define an axially-extending annular chamber, said chamber having an inlet, said control-signal-responsive means comprising means connected to said inlet for applying pressure to said chamber, said cylindrical surface of said tubular member having a circumferential flange, said flange extending radially outwardly as far as said cylindrical surface of said connector body thereby to define a piston, whereby, upon the occurrence of said control signal, pressure is applied to said chamber and said piston by said control-signal-responsive means and said tubular member is moved from said first position to said second position.

3. Apparatus as claimed in claim 2 further comprising a compression spring located between said first connector body and said tubular member and exerting an axial force on said tubular member in a direction tending to move said tubular member from said second position to said first position.

4. Apparatus as claimed in claim 2 for connecting a vehicle to a supply, said inlet being connected to a compressed air braking system of said vehicle, whereby disconnection is automatically effected upon operation of said vehicle braking system.

5. Apparatus as claimed in claim 1, said control-signal-responsive means comprising a cylindrical induction coil mounted on said first connector body and surrounding said tubular member, said tubular member comprising magnetizable material thereby to define an armature, whereby, upon the occurrence of said control signal, a current passes through said coil whereby to exert an axial moving force on said tubular member.

6. Apparatus as claimed in claim 5 for connecting a vehicle to a supply, said coil being connected to an electrical switching system of said vehicle, whereby disconnection is automatically effected upon operation of said vehicle electrical switching system.

7. Apparatus as claimed in claim 1, wherein said second connector body is otherwise unsupported, whereby, upon disconnection of said first and second connection means, said second connector body falls away from said first connector body solely under the force of gravity.

8. A quick release connector arrangement comprising coaxially arranged and relatively movable first and second connector bodies, said first connector body having retractable first connection means, said first connection means being arranged to be connected to complementary connection means of said second connector body for the supply of energy, signals or a commodity from one to the other, said connection between said first connection means and said complementary connection means constituting the sole interconnection of said first and second connector bodies and said second connector body being otherwise unsupported, said first connection means being retractable between a first position for engagement with said complementary connection means and a second, retracted, position for disengagement from said complementary connection means, wherein further means are provided which are responsive to a control signal to move said first connection means from said first position to said second position, and during at least the later stages of said movement there is substantially no relative axial movement between said connector bodies, whereby, after disconnection of said first and said complementary connection means, said second connector body falls away from said first connector body solely under the force of gravity.

* * * * *